US006514410B1

(12) United States Patent
Gantzer

(10) Patent No.: US 6,514,410 B1
(45) Date of Patent: *Feb. 4, 2003

(54) ODOR CONTROL APPARATUS FOR FACULTATIVE LAGOON

(76) Inventor: Charles J. Gantzer, 905 W. 48th St.., Minneapolis, MN (US) 55409-2342

(*) Notice: Subject to any disclaimer, the term of this patent is extended or adjusted under 35 U.S.C. 154(b) by 0 days.

This patent is subject to a terminal disclaimer.

(21) Appl. No.: 09/575,590

(22) Filed: May 22, 2000

Related U.S. Application Data

(63) Continuation-in-part of application No. 09/157,468, filed on Sep. 21, 1998, now Pat. No. 6,103,123.
(60) Provisional application No. 60/059,805, filed on Sep. 23, 1997.

(51) Int. Cl.[7] .................................................. C02F 3/30
(52) U.S. Cl. ........................ 210/605; 210/629; 210/170; 210/188; 210/194; 210/220; 210/242.2; 210/916; 210/DIG. 9; 261/35; 261/77; 261/123
(58) Field of Search ................................. 210/605, 629, 210/630, 747, 170, 194, 220, 242.2, 188, 218, 916, DIG. 9

(56) References Cited

U.S. PATENT DOCUMENTS

| 3,614,072 | A | | 10/1971 | Brodie | |
|---|---|---|---|---|---|
| 3,794,171 | A | | 2/1974 | Kimura et al. | |
| 3,794,303 | A | | 2/1974 | Hirshon | |
| 3,884,804 | A | * | 5/1975 | Robinson et al. | 210/916 |
| 3,956,124 | A | * | 5/1976 | Fast et al. | 210/170 |
| 4,201,663 | A | * | 5/1980 | Rolling et al. | 210/916 |
| 4,202,762 | A | * | 5/1980 | Fontein et al. | 210/629 |
| 4,251,361 | A | | 2/1981 | Grimsley | |
| 4,280,911 | A | * | 7/1981 | Durda et al. | 210/629 |
| 4,293,506 | A | | 10/1981 | Lipert | |
| 4,416,781 | A | | 11/1983 | Bailey et al. | |
| 4,477,393 | A | | 10/1984 | Kos | |
| 4,514,343 | A | | 4/1985 | Cramer et al. | |
| 4,672,691 | A | * | 6/1987 | De Garie et al. | 210/218 |

(List continued on next page.)

FOREIGN PATENT DOCUMENTS

| JP | 6 0025-592 A | | 7/1983 |
|---|---|---|---|
| SU | 889631 | * | 12/1981 |

OTHER PUBLICATIONS

Today's Farmer, Jun./Jul. 1996, "Mixed Blessing" By Chuck Lay pp. 4 Through 9.
Water Science Technology, vol. 22, No. 9, pp. 43–50, 1990 published in Great Britain, T.J. Schulz and D. Barnes.
Evaluation of Various Swine Waste Storage Covers for Odor Control Dec. 31, 1997 Univ. of Minn. Dept. of Biosystems and Agricultural Engr.
Evaluation of Experimental Swine Waste Storage Covers for Odor Control 1996 Annual Report, Univ. of Minn. Dept. of Biosystems and Agricultural Engr.

(List continued on next page.)

Primary Examiner—Christopher Upton
(74) Attorney, Agent, or Firm—Gray, Plant, Mooty, Mooty & Bennett, P.A.

(57) ABSTRACT

An odor control apparatus for a facultative lagoon, and a facultative lagoon created and maintained thereby. The apparatus includes an aerator and a cover. The aerator can include a body with an inlet and an outlet and a support such as a float. The inlet and outlet are submerged slightly beneath the surface of the material in the lagoon. Air supplied under pressure to the aerator diffuses oxygen into the aerobic layer of the lagoon. The dissolved oxygen is used in the biodegradation of the hazardous and odorous gases of the waste material that would otherwise be emitted into the atmosphere. The cover is either porous or non-porous and covers some or substantially all of the lagoon surface. The cover promotes accumulation and concentration of desirable odor degrading bacteria in the lagoon.

22 Claims, 4 Drawing Sheets

U.S. PATENT DOCUMENTS

| | | | |
|---|---|---|---|
| 4,708,308 A | | 11/1987 | Snider |
| 4,724,086 A | * | 2/1988 | Kortmann ................ 210/242.2 |
| 4,965,022 A | | 10/1990 | Litz |
| 5,049,265 A | * | 9/1991 | Boyd et al. ................. 210/916 |
| 5,234,595 A | * | 8/1993 | Di Gregorio et al. ....... 210/605 |
| 5,314,619 A | * | 5/1994 | Runyon ...................... 210/170 |
| 5,400,549 A | * | 3/1995 | Morgan |
| 5,624,562 A | * | 4/1997 | Scroggins .................. 210/605 |
| 5,630,936 A | * | 5/1997 | Oyzboyd ..................... 261/77 |
| 5,861,095 A | * | 1/1999 | Vogel et al. ................ 210/605 |
| 6,071,418 A | * | 6/2000 | Tai ............................. 210/916 |
| 6,136,185 A | * | 10/2000 | Sheaffer ..................... 210/605 |

OTHER PUBLICATIONS

Experimental Manure Storage Covers for Odor Control 1997 Annual Report, Univ. of Minn. Dept. of Biosystems and Agricultural Engr.

Generic Environmental Impact Statement on Animal Agriculture: A Summary of the Literature Related to Air Quality and Odor; A Summary of the Literature Related to Social, Environmental, Economic and Health Effects, University of Minnesota, Sep. 1999.

Swine Manure Storage Covers for Odor Control, Applied Engineering in Agriculture, 15(5): 567–572 (1999).

Odor and Volatile Organic Compound Emission Control, WEF Specialty Conference Proceedings, The Omni Jacksonville Hotel, Jacksonville, Fla., Apr. 24–27, 1994.

* cited by examiner

ODOR CONTROL APPARATUS FOR FACULTATIVE LAGOON

CROSS REFERENCE TO RELATED APPLICATION

This application is a continuation-in-part of U.S. patent application Ser. No. 09/157,468 filed Sep. 21, 1998 now U.S. Pat. No. 6,103,123 entitled Aeration Device and Method for Creating and Maintaining Facultative Lagoon which claims benefit to Provisional Application No. 60/059,805 filed Sep. 23, 1997.

BACKGROUND OF THE INVENTION

Large-scale pork production is a profitable industry in several regions of the Nation. Unfortunately, this economic success is often at the expense of local ambient air quality. The emission of hazardous and odorous gases from hog manure basins has polarized many rural communities. Public and regulatory pressure applied on the pork industry to control its air emissions already has slowed the expansion of the industry in certain regions. This has potentially severe economic consequences on rural and state economies. The continued economic viability of the regional pork industry and associated rural communities requires that pork production facilities adapt air pollution control technologies that ensure sustainable development. The same need for air pollution control exists in other industries with high-strength organic waste streams, such as the sugar refining, dairy, cannery, and food processing industries.

Modern, large-scale pork production is seldom cited as an example of sustainable development, because of the external and often unpaid costs associated with potential adverse effects on local water and air resources. The present trend is that the large-scale pork production facilities provide an increasingly greater fraction of the nation's pork production. The spatial concentration of hogs and hog manure in such facilities results in the release of hazardous and odorous gases that exceed the natural ability of the atmosphere to maintain by dispersion concentrations below acceptable levels. Odors emitted from outdoor anaerobic basins can be detected by substantial portions of the population for considerable distances downwind of the basin. The lack of cost-effective technologies to control the emission of hazardous and odorous gases limits the growth of hog industry at a time when the demand for pork products is increasing. These constraints may result from tougher zoning regulations or fear of litigation. For example, the Sep. 12, 1994 issue of Farmweek magazine published a story describing how neighbors of an 800-hog operation in Iowa were awarded $45,000 in damages because of noxious odors, and another story describing how public concerns over hog odors in North Carolina forced county zoning boards to prohibit hog operations in certain locations (e.g. within one mile of towns). Thus, the spatial concentration of hogs and hog manure into larger operations results in a potential reduction in local air quality, which has both public health and public nuisance components.

With the exception of North Carolina, currently most of the pork production in the United States occurs in the corn belt states and parts of their immediate neighbors. Table 1 indicates the monetary value of pork production to the central United States. The crop farmers of this region depend directly and indirectly on the pork and other livestock industries. Midwestern farmers have invested in pork production facilities on their own properties or as part of cooperatives to provide income when crop prices are low. However, the present inability to control the emission of hazardous and odorous gases threatens the livelihood of region's pork industry and the economic viability of rural communities. Such a loss of pork production would represent a significant loss to the Upper Midwest economy in terms of those activities involved directly (Table 1) and indirectly (corn and soybean growers, meat packers, distribution) with pork production.

TABLE 1

Pork production and direct market value for the 10 major pork producing states.

| Rank | State | Head marketed (In 1000's) | Estimated Value (US $ in millions) |
|---|---|---|---|
| 1 | Iowa | 24,160 | 3,020 |
| 2 | North Carolina | 11,455 | 1,432 |
| 3 | Minnesota | 9,724 | 1,216 |
| 4 | Illinois | 9,462 | 1,183 |
| 5 | Indiana | 7,846 | 981 |
| 6 | Nebraska | 7,346 | 918 |
| 7 | Missouri | 6,071 | 759 |
| 8 | Ohio | 3,623 | 453 |
| 9 | South Dakota | 3,329 | 416 |
| 10 | Kansas | 2,404 | 301 |

Aside from aerobic biological treatment, few (if any) technologies have been proven effective in reducing the emission of hazardous air pollutants and odorous compounds from hog manure facilities under diverse environmental and managerial conditions. Part of the problem in developing manure additives for odor control is that the specific compounds responsible for mal-odors have not been satisfactorily identified. Without knowing what the chemical targets are for odor control, the end result is an essentially blind development of odor control products that are only partially effective (at best) in controlling odors.

The anaerobic biodegradation of hog manure generates several general classes of compounds that are considered hazardous, odorous, or both. These classes compounds include ammonia, reduced sulfur compounds (hydrogen sulfide, mercaptans), volatile fatty acids (n-butyric acid, valeric acid), phenolic compounds (phenol, para-cresol), indoles (skatole, indole), and volatile amines (putrescine, cadaverine). In general, the more offensive odorous compounds are associated with the anaerobic biodegradation of proteins. Because of the wide range in chemical properties represented by these classes of hazardous and odorous compounds, no one additive or process can be expected to control all offensive odors—that is except for aeration. Aeration and the associated aerobic biological treatment can result in the biodegradation of all the above hazardous and odorous gases.

High operating costs are currently associated with aerating large volumes of high strength wastes. It has been suggested that aerobic biological treatment should only be used in situations where odor control is essential, because of the high operating costs. The cost for aerobic biological treatment of the entire manure stream generated by a 150 lb finishing pig is estimated to be about $7.00 per marketed pig. This high operating cost for complete aerobic treatment of hog manure continues to limit its acceptance by the pork production industry.

One means of reducing the costs of aeration is to reduce the volume of water that is aerated by operating outdoor hog manure basins as facultative lagoons. Facultative lagoons have been used in the municipal and industrial waste water treatment industries for decades as a means of meeting treatment objectives with reduced aeration costs. A facultative lagoon is one that has an aerobic (oxygen present) layer above an anaerobic (no oxygen present) layer. The offensive hazardous and odorous gases generated in the anaerobic layer are oxidized by the aerobic (oxygen-requiring) bacteria found in the upper layer of a facultative lagoon and converted into inoffensive products. However, as shown in Table 2, the operating costs associated with using the traditional waste water treatment approach to a facultative lagoon are still too expensive for odor control at most pork production operations.

TABLE 2

Estimated aeration costs for the aerobic biological treatment of hog manure.

| Treatment Option | Aeration Operation Costs ($/hog marketed) |
| --- | --- |
| aerobic treatment of the entire hog manure basin | 7.00 |
| facultative lagoon as traditionally operated in the wastewater treatment industry | 3.70 |
| ideal facultative lagoon for odor control with biological ammonia oxidation in the upper aerobic layer | 1.50 |
| ideal facultative lagoon for odor control without biological ammonia oxidation in the upper aerobic layer | 0.25 |

Ideally, the operation of the facultative lagoon designed primarily for odor control should supply just enough aeration to biodegrade the hazardous and odorous gases that would otherwise be emitted into the atmosphere. Such an approach is feasible, because many of the offensive organic and inorganic gases released during the anaerobic decomposition of hog manure are preferentially biodegraded under aerobic conditions compared to the other components that make up the bulk biological oxygen demand of hog manure. Because the ideal facultative lagoon does not need to maintain sufficient dissolved oxygen concentrations to encourage nitrification, the oxygen demand associated with the biological oxidation of ammonia to nitrate can be removed from the oxygen requirement. Without nitrification, the aeration cost of odor control with the ideal facultative lagoon is $0.25/hog marketed.

As shown in Table 2, a facultative lagoon designed for odor control is significantly more cost effective than the other aerobic biological processes and has a theoretical minimum aeration cost of $0.25/hog marketed. This minimum ideal cost can be approached by aeration equipment that maintains redox potential of at least −100 mV in an aerobic mixing zone that is no greater than one foot thick.

Basin covers are another technology for reducing the emisssion of odorous gases from anaerobic lagoons. Covering at least part of an anaerobic lagoon's liquid surface reduces odorous gas emissions. Non-porous and porous materials are used to cover anaerobic basins. Non-porous covers provide a means for containing and collecting the odorous gases released by the anaerobic lagoon. The air space maintained beneath a non-porous cover can be vented to air polution control equipment (e.g., flares, biofilters) or methane combustion equipment, which destroy the odors prior to release into the atmosphere. The stagnant air pockets within a porous cover provide additional mass transfer resistance for the movement of gases from the liquid surface of the anaerobic lagoon to the atmosphere. The slow, metered release of odorous gases allows air quality standards to be achieved without requiring gas collection and the installation of additional air pollution control equipment.

Both non-porous and porous covers also reduce hazardous and odorous gas emissions by maintaining quiescent conditions at the liquid surface of an anaerobic lagoon, and by allowing the attachment and accumulation of anaerobic bacteria on their bottom surfaces. The emission of hydrogen sulfide, ammonia, and other volatile gases are accelerated by water turbulence at the air/water interface. By preventing wind-induced mixing at the liquid surface of an anaerobic lagoon, covers reduce the emission of volatile gases by reducing water turbulence. Where a cover is in physical contact with the high-strength wastewater stored in an anaerobic lagoon, anaerobic bacteria will attach and colonize the underside of the cover. The resulting anaerobic microbial slime layer results in enhanced biological activity where it is most needed for odor control—at the air/water interface. The beneficial effects due to the accumulation of anaerobic bacteria on the underside of the cover are typically associated with porous covers, because porous covers are almost always in contact with the liquid surface. The gas pockets that develop under non-porous covers and the air space that is maintained for venting any captured gas can limit the physical contact of the cover with the liquid surface.

SUMMARY OF THE INVENTION

The present invention relates to an odor control apparatus for a facultative lagoon. The odor control apparatus has two major components: aeration equipment and a basin cover. The aeration equipment provides sufficient dissolved oxygen under the basin cover to convert the otherwise anaerobic wastewater basin into a facultative lagoon. A facultative lagoon has an aerobic layer of water existing above an anaerobic layer of water. The aerobic layer has sufficient oxygen (e.g., redox potentials greater than −100 mV) to sustain a population of aerobic bacteria capable of biodegrading the odorous compounds generated in the anaerobic portion of the lagoon. The basin cover at least partially covers the lagoon and has three main functions. First, the cover mitigates the release of hazardous and odorous gases that would otherwise escape biodegradation in the aerobic layer. This would include the gas "burps" and bubbles released from the anaerobic sediments located at the lagoon's bottom. Second, the cover prevents the wind from vertically mixing the basin's water column and destroying the layered structure of the facultative lagoon. Third, aerobic bacteria will colonize the underside of the basin cover that is in contact with the wastewater. The resulting retention of aerobic bacteria in the aerobic layer of the facultative lagoon increases the effectiveness and operational stability of the odor control apparatus. A cover also promotes the thermal stratification of the lagoon's water column, which helps maintain separate aerobic and anaerobic layers in the lagoon.

Several different types of aeration equipment can be used in the present invention. A fundamental requirement for the aeration equipment is that sufficient oxygen be provided for biological odor control in the covered facultative lagoon without vertically mixing the lagoon's water column.

An airlift aerator meets the aeration and mixing requirements for the present invention. An airlift aerator according to the invention includes a float or cables to sustain the device with respect to the lagoon surface. The aerator can include a U-shaped tube including a down flow leg and an airlift leg. The upper ends of the legs are upright such that the lower ends extend downward into the lagoon. The upper end of each leg is open to the lagoon near the surface thereof. Preferably the upper end of each leg has a horizontal portion forming an inlet in the case of the down flow leg, and an outlet in the case of the airlift leg. Preferably both the inlet and outlet are located in the targeted aerobic zone or layer. The targeted aerobic zone includes those portions of the lagoon that are located beneath the basin cover. A source of pressurized air is connected to the airlift leg at a location toward the lower end thereof. The air source is connected to a bubble diffuser open to the airlift leg.

The airlift aerator is operated by supplying air under pressure to the bubble diffuser. Bubbles are generated inside of the airlift leg and move upward. This creates fluid circulation in the airlift aerator. Oxygen deprived surface water is drawn into the down flow leg. This water travels down the down flow leg, around the connecting elbow, and up the airlift leg. Oxygen is transferred from entrained air bubbles to the oxygen deprived water. The aerated water is discharged to the lagoon surface layer creating and maintaining an aerobic layer to the lagoon approaching the ideal condition where just enough aeration is supplied to biodegrade the hazardous and odorous gases that would otherwise be emitted into the atmosphere.

Other types of aeration equipment can be used in the present invention, including mechanical aerators (e.g., aeration device described in U.S. Pat. No. 4,280,911), aspirators (e.g., aeration device described in U.S. Pat. No. 5,314,619), venturi injectors, and membrane-based aerators (e.g., aeration devices described in U.S. Pat. No. 5,034,164 and in U.S. Pat. No. 5,674,433). These examples of suitable aeration equipment would supply a jet of aerated wastewater into the aerobic water layer located beneath the basin cover. However, suitable aeration equipment need not be limited to equipment that generates a water jet. For example, a network of oxygen-permeable tubing (e.g., silicone tubing) or oxygen-permeable hollow-fiber membranes (e.g., microporous polyethylene hollow-fibre membranes could be attached or otherwise positioned beneath the basin cover. Air or pure oxygen would be supplied under pressure to the lumen of the tubing or hollow-fiber membranes. Aerobic bacteria would colonize the outer surfaces of the tubing or hollow-fiber membranes resulting in the biodegradation of odorous compounds.

In addition to dissolving oxygen in the aerobic water layer beneath the cover, the aeration component of the odor control apparatus could be used to dissolve other gases that are beneficial in the biodegradation of the odorous gases. For example, the dissolution of ozone in combination with aeration may improve odor control by chemically oxidizing certain odorous gases. Also, the oxidative cleavage of the aromatic rings found in phenols and odorous heterocylic compounds by ozone increases the susceptibility of the compounds to aerobic biodegradation.

The basin cover component of the present invention floats on the water surface and can either be made of non-porous (impermeable) or porous (permeable) materials. Non-porous covers can be made from plastic or hydrocarbon-based materials. A floating non-porous cover captures the air not dissolved by the aeration equipment and the odorous gases not biodegraded in the aerobic layer of the facultative lagoon. The collected gas needs to be vented and perhaps treated prior to emission into the atmosphere. Without venting, the non-porous cover would fill with air and no longer be in contact with the liquid surface. Cover inflation is undesirable because the loss of the cover/wastewater interface means the loss of the aerobic bacterial film on the underside of the cover from the facultative lagoon.

Porous floating basin covers can be made from a wide range of natural and man-made materials. Examples of natural porous covers include the fibrous crusts on dairy manure basins, straw, rice hulls, and cornstalks. Examples of man-made porous covers include plastic foam pellets, mats, tarpaulins, clay balls, and geotextile membranes (polypropylene felt). If the porous basin covers lack sufficient gas permeability to allow passage of the undissolved air from the aeration equipment, then vents will be required to exhaust the undissolved air and to prevent cover inflation. In addition to the aerobic bacteria on the underside of the floating cover, aerobic bacteria living within the humid, air-filled pores of a porous floating cover can also biodegrade odorous gases before emission into the atmosphere.

In terms of a method, a facultative lagoon is created and maintained by providing aeration device operating in an upper layer of the lagoon in combination with a cover covering part of, or substantially all of, the lagoon surface.

IN THE DRAWINGS

DESCRIPTION OF A PREFERRED EMBODIMENT

Figure 1:
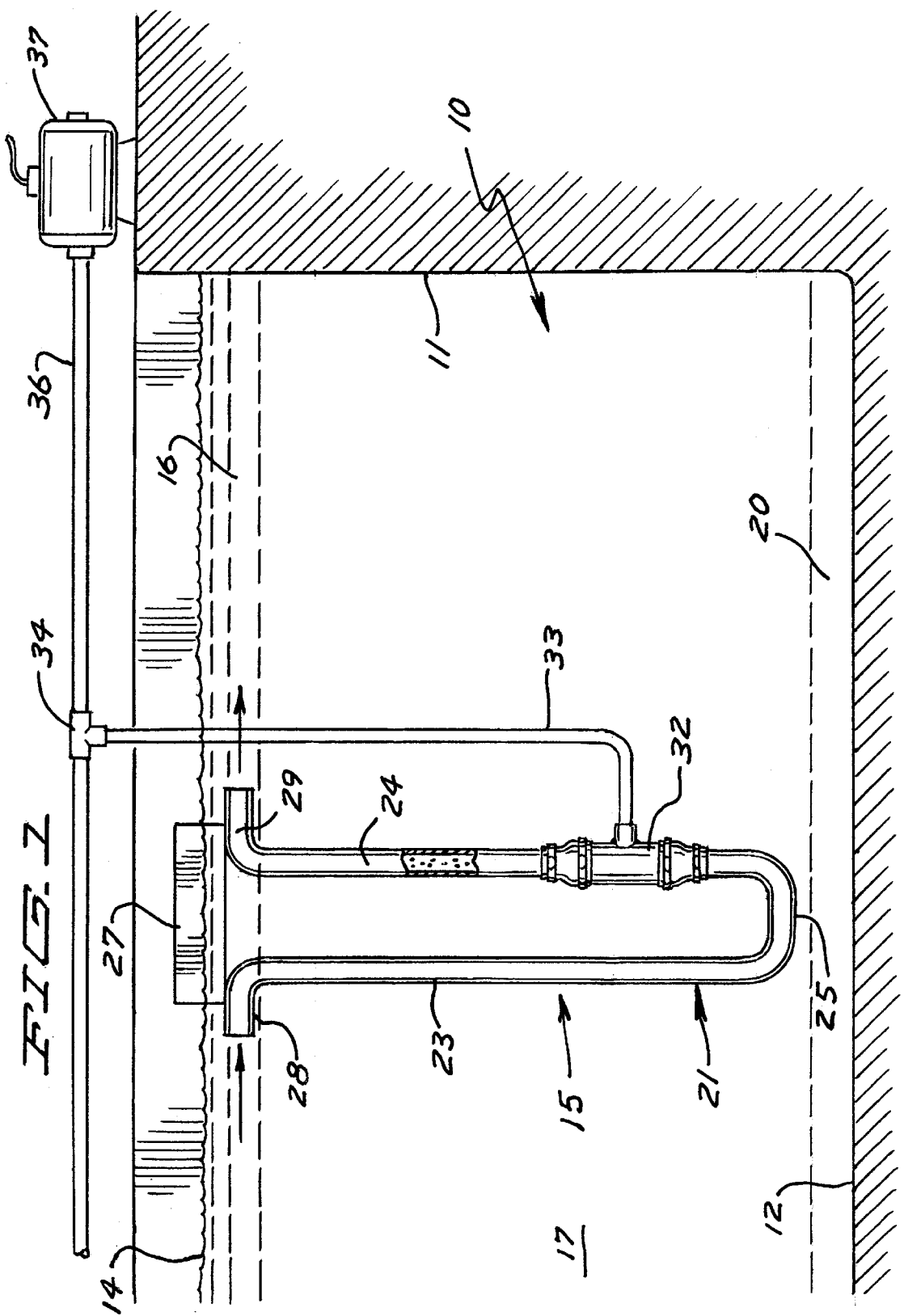
FIG. 1 shows an aerator according to the invention installed in a pollution control waste lagoon.

Referring to FIG. 1, there is shown an animal waste manure basin 10 which is formed by side walls 11 and a floor 12. The basin is filled with liquid, organic, anaerobic waste material. An airlift aerator according to the present invention is indicated at 15 and transforms the basin 10 into a facultative lagoon for air pollution control. The facultative lagoon has an aerobic layer 16 at the surface 14 of the lagoon and extending a short distance beneath the surface 14. The main body of waste contained in the basin 10 is comprised as untreated waste 17 mixed with or suspended in water. A sediment layer 20 can rest on the floor 12.

The aerobic layer 16 contains dissolved oxygen supplied by the aerator 15 whereby the offensive hazardous and odorous gasses generated in the anaerobic layer are biologically oxidized in the aerobic layer and released to the atmosphere as unoffensive gases.

Airlift aerator 15 includes a U-shaped tube body 21 that has a vertical down flow leg 23 and a vertical airlift leg 24. Legs 23, 24 are connected at the bottom ends by an elbow 25.

A float 27 connected by suitable means to the upper end of body 21 is sufficient to sustain the aerator 15 with respect to the surface 14 of the lagoon. The down flow leg 23 has a horizontal water inlet 28 at the top end thereof. The airlift leg 24 has a horizontal water outlet 29 at the top thereof facing opposite the direction of the water inlet 28. Both inlet 28 and outlet 29 are located in the targeted aerobic layer 16. Float 27 sustains the water inlet 28 and water outlet 29 a slight distance beneath the surface 14 of the lagoon.

A bubble generator or bubble diffuser 32 is connected to the airlift leg 24 at the lower end near the elbow 25. Bubble diffuser 32 is connected to air line 33 for receipt of air under pressure. The air line 33 extends to a tee 34 connected to a main air pipe 36 which extends to an air supply or pump 37. A number of aerators 15 can be interconnected in a single lagoon as will be presently described.

Bubble diffuser 32 generates bubbles in the water in the airlift leg 24 from air supplied under pressure through the air line 33. The bubbles rise in the airlift leg 24 and move the water with it creating a circulation through the U-shaped body 21 beginning at the water inlet 28 and discharging at the water outlet 29.

Figure 2:
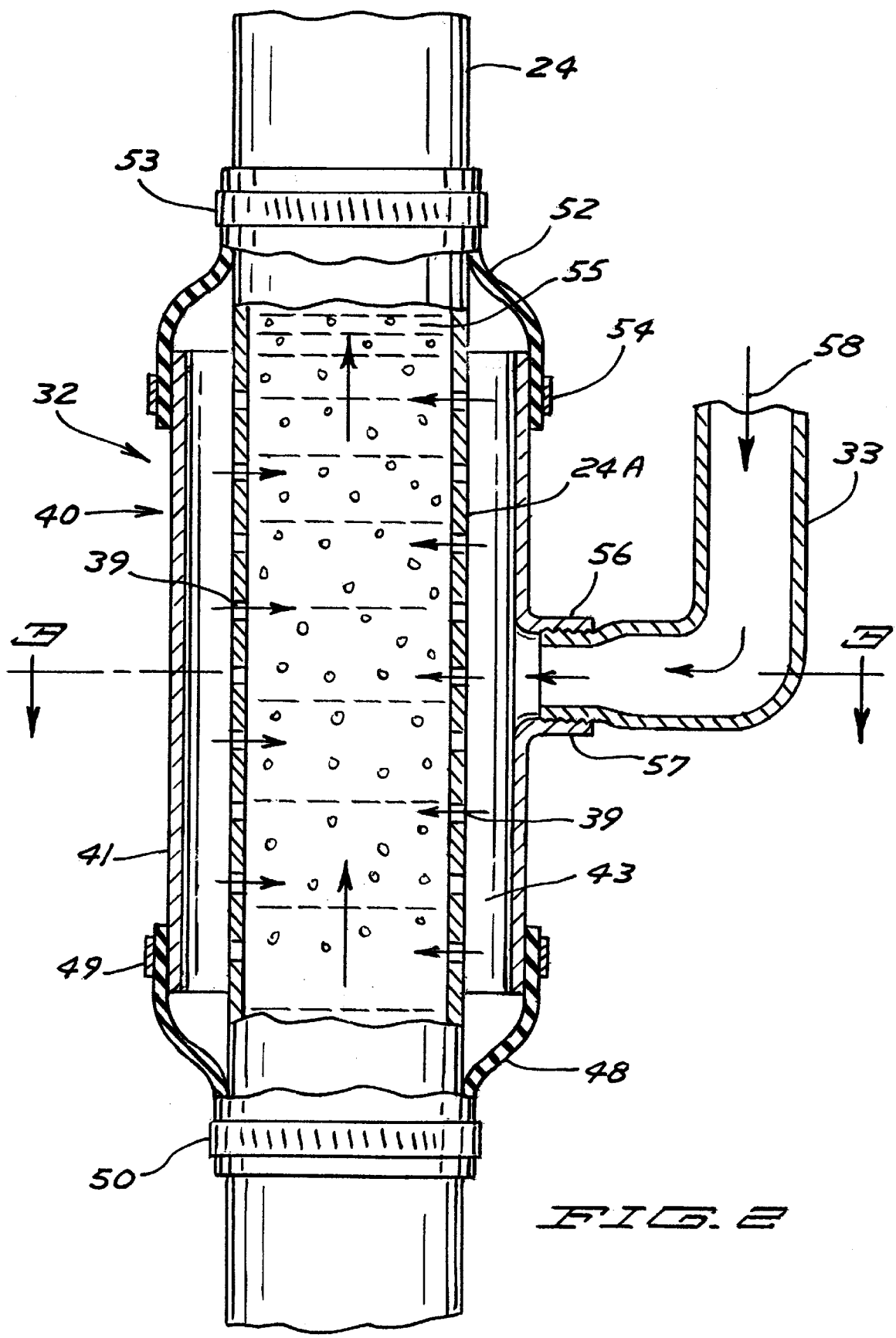
FIG. 2 is a view of a section of the airlift leg of the aerator of FIG. 1 with portions removed for purposes of illustration.
Figure 3:
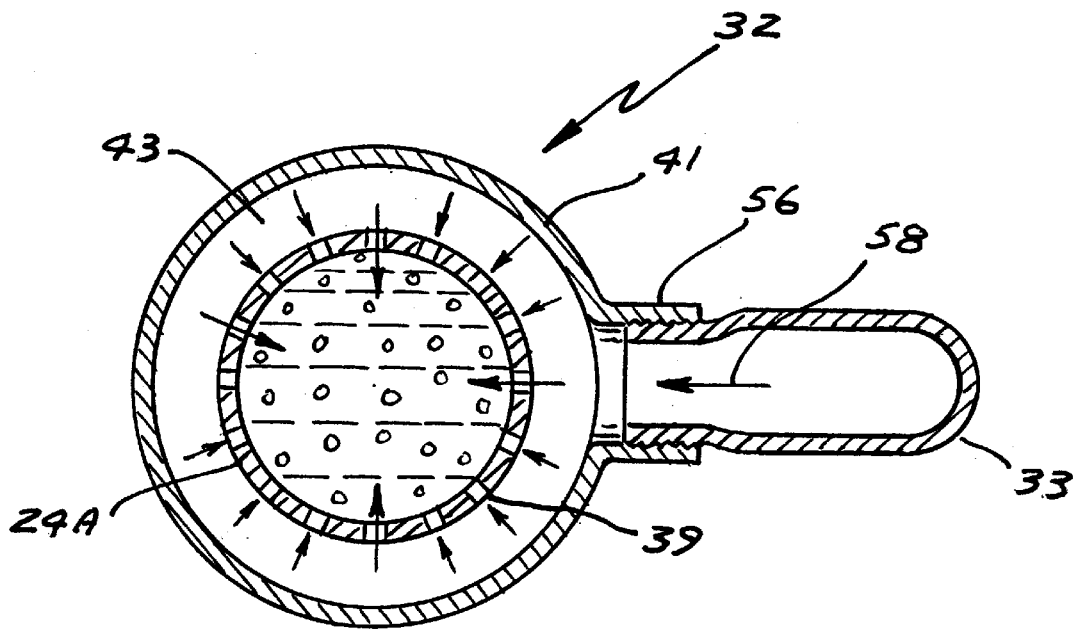
FIG. 3 is a sectional view of a portion of the airlift leg of the aerator shown in FIG. 2 taken along the line 3—3 thereof.

A particular bubble diffuser arrangement is shown in FIGS. 2 and 3. A section of the airlift leg 24A has a plurality of orifices or ports 39 for the creation of bubbles. Ports 39 are distributed evenly around the circumference of the section 24A, arranged in patterns one above the other in an orderly array. A bubble diffuser housing 40 comprises a sleeve like structure 41 that surrounds the section 24A. Sleeve 41 forms a diffuser chamber or plenum 43 around pipe section 24A. A lower boot or flexible coupler 48 secured by hose clamps 49, 50 covers the lower juncture of the sleeve 41 and the airlift pipe 24. An upper boot or flexible coupler 52 secured by hose clamps 53, 54 covers the juncture between the top of the sleeve 41 and the upwardly extending adjacent segment of the airlift pipe 24A.

Boss 56 attached to the side of the sleeve 41 opens to the diffuser chamber 43. Boss 56 connects with the end 57 of the air line 33. Air, indicated by the arrow 58, flows through the air line 33 through the boss 56 into the diffuser chamber or plenum 43.

In operation of the aerator 15, referring again to FIG. 1, the pump 37 is energized to provide air under pressure through the main air pipe 36 and through the air line 33 into the bubble diffuser 32. Air enters through the boss 56 into the diffuser or plenum chamber 43. The air passes through the ports 39 which are of a size such that the air enters the water passage through the pipe segment 24A as bubbles indicated at 55. The bubbles rise in the pipe segment 24A creating a water flow or circulation. Water enters the water inlet 28 of the down flow leg 23, following a path down the down flow leg, around the elbow 25 and up the air uplift leg 24. As it passes through the bubble diffuser, the water is entrained with air bubbles. Oxygen is transferred from the entrained air bubbles to the oxygen deprived water. The aerated water exits the water outlet 29. It disburses oxygen into the aerobic layer 16.

By way of example, the diameter of the pipe forming the U-shaped tube 21 can be 3 inches. An airflow rate of 1.2 liter per second can be provided. The aerated plume generated by the 3 inch diameter airlift aerator is estimated to be six meters wide at a distance of 15 meters away from the aerator. The length of the legs 23, 24 of the body 21 can be 5 feet which will correspond roughly to the depth that the aerator will be submerged at its maximum point beneath the surface 14 of the lagoon.

In terms of a method, a facultative lagoon is formed and maintained by providing one or more aerators each having a U-shaped body with a water inlet connected to a down flow leg, the down flow leg connected to an airlift leg, connected to a water outlet; providing a bubble diffuser at a lower end of the airlift leg; and supplying air under pressure to the bubble diffuser whereby a water circulation is established into the water inlet, down the down flow leg of the aerator, up the airlift leg, passing through the bubble diffuser where oxygen is diffused into the water, and disbursing the oxygen entrained water through the water outlet into an aerobic water layer of the lagoon.

Figure 4:
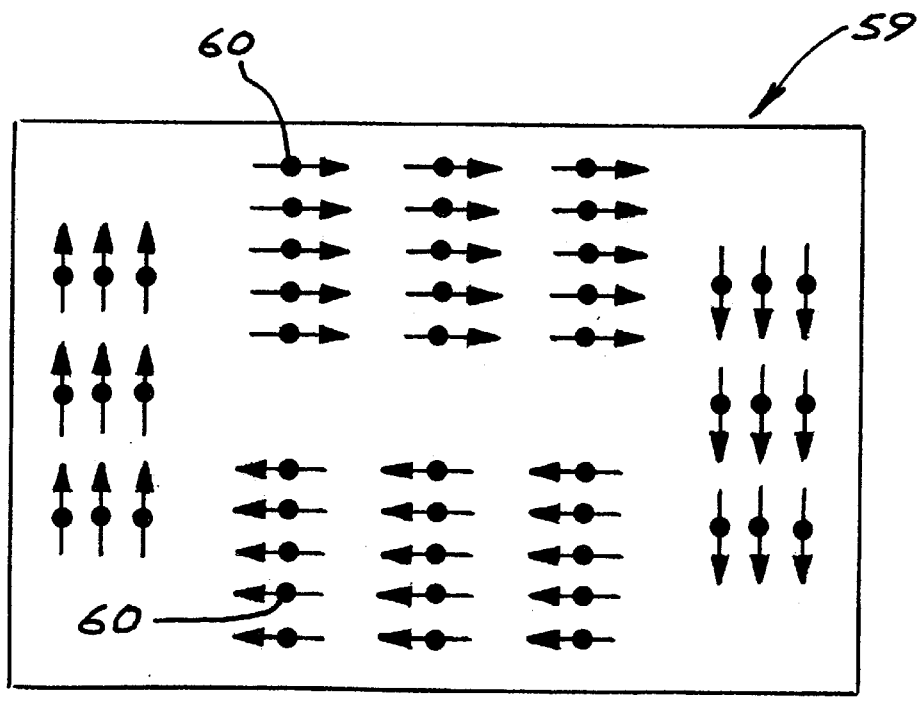
FIG. 4 is a schematic representation of a plurality of airlift aerators according to the invention installed in a pollution control basin to operate a facultative lagoon for air pollution control.

A scheme for producing a facultative lagoon from a plurality of airlift aerators is shown in FIG. 4. A lagoon is indicated at 59. A plurality of airlift aerators 60 are installed in the lagoon in such a fashion as shown in order to induce circulation about the lagoon. The aerators are installed in rows and columns and arrange with water inlets and outlets oriented to form a circulatory flow pattern. An array of aerators is parallel to each side of the lagoon. The purpose is to create a one foot thick aerobic water layer with a redox potential of at least −100 mV, that circulates around the basin going from one line of airlift aerators to the next. The airlift aerators are placed in such a fashion that no jets of aerated water hit another head on, and so that no significant areas of stagnant surface water exists. It is desirable to avoid both of these conditions as they would increase the release of hazardous odorous gases into the atmosphere. The first by increasing vertical mixing and bringing anaerobic water to the surface. The second condition increases the release of undesirable gases by creating anaerobic conditions at the water surface.

Figure 5:
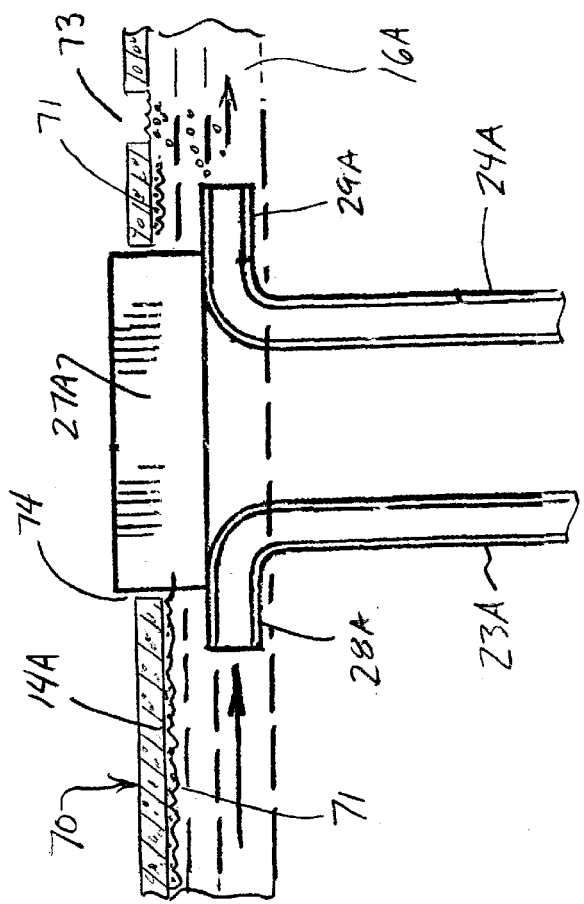
FIG. 5 shows a portion of an aerator installed in a pollution control lagoon like that shown in FIG. 1 in combination with a cover.

FIG. 5 shows a facultative lagoon odor control apparatus according to another form of the invention. An aerator 15A is installed in an odor control lagoon. Aerator 15A is only partially shown in FIG. 5, but is like the aerator 15 shown in FIG. 1. Aerator 15A has a down flow leg 23A and a vertical airlift leg 24A connected by an elbow (not shown). The lagoon has a liquid surface 14A. The legs 23A, 24A are supported with respect to the surface 14A by a float 27A, or by equivalent means such as structure fixed at the basin perimeter and extending over it.

Aerator 15A is complemented by a basin cover 70. The basin cover 70 can be either made of non-porous (impermeable) or porous (permeable) materials. An example of a non-porous cover is one made of plastic membrane. An example of a porous cover is one formed from a 3/16-inch thick polypropylene felt, which is also marketed as a geo-textile. Basin cover 70 can cover the entire lagoon surface or just portions of it.

Basin cover 70 functions in conjunction with the aerator 15A and enhances the odor control characteristics of the facultative lagoon by three major mechanisms. First, the cover mitigates the release of hazardous and odorous gases that would otherwise escape biodegradation in the aerobic layer. This would include the gas bubbles released from the anaerobic sediments located at the lagoon's bottom. Second, the cover prevents the wind from vertically mixing the basin's water column and destroying the layered structure of the facultative lagoon. The facultative lagoon created by one or more aerators 15A controls odor when the water layer 16A supports the growth and accumulation of bacteria capable of degrading volatile acids, phenolics and sulfides. High winds prevent maintenance of an aerobic layer of water at the lagoon surface. A floating cover protects the lagoon from wind-induced mixing. With aeration equipment that provides the required oxygen for odor control without mixing the lagoon's water column, a floating basin cover protects the layered structure of a facultative lagoon. Third, aerobic bacteria will attach to and colonize the underside of the basin cover that is in contact with the wastewater, as indicated at 71 in FIG. 5. The resulting retention of aerobic bacteria in the aerobic layer 16A of the facultative lagoon increases the effectiveness and operational stability of the odor control apparatus. The aerobic bacteria are capable of biodegrading odorous gases that would otherwise be released to the atmosphere. The cover also promotes the thermal stratification of the lagoon's water column.

The basin cover can have one or more vent openings 73. Vent openings 73 permit release of undissolved air bubbles emitted from the water outlet 29A of the airlift leg 24A and prevent inflation of the cover and less contact with the wastewater surface. The basin cover 70 can have other openings beside the opening 74 as may be necessary for the accommodation of support structure or air lines or other such adjunct equipment.

Figure 6:
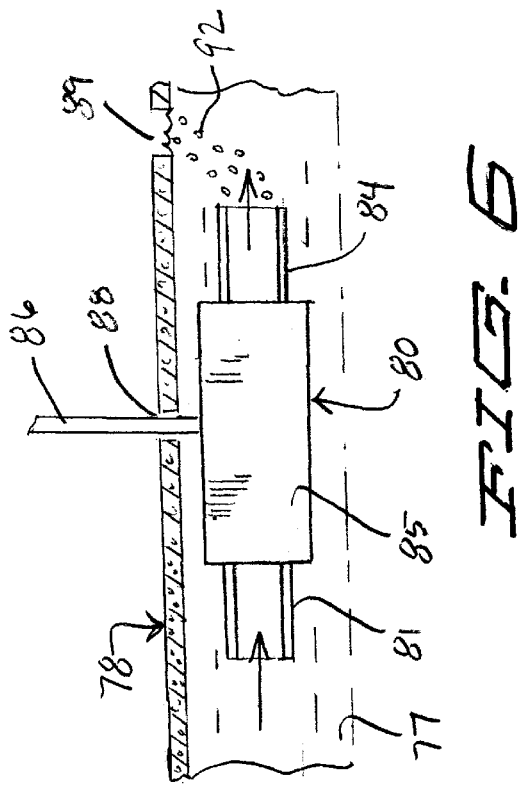
FIG. 6 shows another form of an aeration device installed in a pollution control lagoon, in combination with a porous cover.

FIG. 6 shows another form of facultative lagoon odor control apparatus according to the invention. A facultative lagoon has an aerobic layer 77. An odor control apparatus includes a basin cover 78 and an aeration device 80. Cover 78 may or may not be porous. Aeration device 80 can include a body 85 containing a water pump and an air diffuser or bubble generator. An example of a suitable bubble generator is a venturi-based aspirator. A fluid inlet leg or pipe 81 is open to the body 85. A fluid outlet leg or pipe 84 extends out of the body 85. An air line 86 extends through an access opening 88 in the cover 78 and supplies air to the aerator 80. The inlet and outlet legs 81, 84 are horizontal and are located a short distance beneath the surface of the lagoon so as to draw water from and discharge it to the aerobic layer 77.

Water in the aerobic layer 77 enters the water inlet pipe 81. Atmospheric oxygen is dissolved into the stream of water in the body 85. The aerated water discharges through the outlet pipe 84. Excess air bubbles 92 leave through a vent opening 89 in the cover 78.

As used herein the term "aeration device" refers to a device capable of diffusing air or oxygen into a water based liquid. Other types of aeration devices can be used to created a jet of aerated water within the aerobic layer 77. By way of example, other types of aeration devices are shown in the following U.S. Pat. No. 3,614,072 issued Oct. 17, 1971 to Brodie; U.S. Pat. No. 3,956,124 issued May 11, 1976 to Fast et al; U.S. Pat. No. 4,251,361 issued Feb. 17, 1981 to Grimsley; U.S. Pat. No. 4,202,762 issued May 13, 1980 to Fontein et al; U.S. Pat. No. 4,280,911 issued Jul. 28, 1981 to Durda et al; U.S. Pat. No. 5,034,164 issued Jul. 23, 1991 to Semmens; U.S. Pat. No. 5,314,619 issued May 24, 1994 to Runyon; U.S. Pat. No. 5,630,936 issued May 20,1997 to Oyzboyd; and U.S. Pat. No. 5,674,432 issued Oct. 7, 1997 to Semmens et al. The foregoing are meant by way of example and not limitation. The aeration equipment could also include an array of segments of gas permeable tubing or hollow fiber membranes installed beneath the cover and attached to an air supply. Aeration device 80 can be supported by air line 86 or other suitable structure.

While there have been shown and described certain embodiments of an odor control apparatus for a facultative lagoon according to the present invention, certain modifications and deviations will be apparent to one skilled in the art without departing from the scope and spirit of the invention.

The embodiments of the invention in which an exclusive property or privilege is claimed are defined as follows:

1. A facultative lagoon comprising:
   a lagoon basin;
   a water based liquid organic anaerobic waste material in the basin;
   at least one aerator located in the basin to create and maintain an aerobic layer at the surface of the waste material with an anaerobic layer beneath the aerobic layer;
   said aerator having a fluid inlet and a generally horizontal fluid discharge, said fluid inlet and fluid discharge located a short distance beneath the top surface of the material in the lagoon so as to draw water from the aerobic layer and discharge aerated water into the aerobic layer;
   a gas permeable basin cover on the top surface of the waste material at least partially covering the surface of the waste material in the basin.

2. The facultative lagoon of claim 1 wherein:
   said basin cover is made of a material that floats.

3. The facultative lagoon of claim 2 wherein:
   said basin cover is made of a porous material.

4. The facultative lagoon of claim 1 including:
   a plurality of aerators located in the basin with water inlets and outlets oriented to form a circulatory float pattern around the basin.

5. The facultative lagoon of claim 4 including:
   a plurality of ventilation openings in the cover.

6. The faculative lagoon of claim 1 wherein:
   said aerator includes a bubble generator connected between the inlet and the discharge.

7. A facultative lagoon comprising:
   a lagoon basin;
   a water based liquid organic anaerobic waste material in the basin;
   at least one aerator located in the basin to create and maintain an aerobic layer at the surface of the waste material;
   said aerator having a tubular U-shaped body including a downflow leg and an airlift leg, each leg having a top end and a bottom end, said legs being connected at the bottom end;
   said water inlet to the downflow leg near the top end thereof;
   said water outlet from the airlift leg near the bottom end thereof;
   said U-shaped body being closed between the water inlet and the water outlet;
   means sustaining the U-shaped body submerged with respect to the surface of the material in the basin with the water inlet and the water outlet submerged a short distance beneath the surface of the material and the downflow leg and airlift leg extending downwardly;
   a bubble generator connected to the airlift leg near the lower end thereof;
   air supply means connected to the bubble generator for dispersing bubbles into water located in the airlift leg whereby water circulation is established in the U-shaped body and oxygen is transferred from the bubbles to water discharged through the water outlet.

8. The facultative lagoon of claim 7 wherein:
   said basin cover is made of a material that floats.

9. The facultative lagoon of claim 8 wherein:
   said cover is made of a porous material.

10. The facultative lagoon of claim 9 wherein:
    said cover is made of a geotextile material.

11. The facultative lagoon of claim 7 wherein:
    means sustaining the U-shaped body with respect to the surface of the material comprises a float connected to the U-shaped body.

12. The facultative lagoon of claim 7 wherein:
    the water inlet and water outlet are generally horizontally disposed and face in opposite directions.

13. An odor control apparatus for use in a pollution control lagoon of the type having a lagoon basin that is filled with an organic waste material having an aerobic layer and an anaerobic layer beneath the aerobic layer, comprising:
- a gas permeable basin cover adapted to cover the top surface of the waste material in the basin;
- an aerator positioned a short distance beneath the basin cover in the basin for receipt of air under pressure in order to introduce oxygen to the material beneath the cover to create and sustain an aerobic layer, said aerator including a generally horizontal fluid inlet leg and a generally horizontal fluid outlet leg, said fluid inlet leg and fluid outlet leg positioned a short distance beneath the cover in order to draw water from an aerobic layer of a lagoon with the cover installed thereon, and discharge it into the aerobic layer.

14. The odor control apparatus of claim 13 wherein:
said basin cover is made of a gas impermeable material.

15. The odor control apparatus of claim 13 wherein:
said basin cover is made of a material that floats.

16. The odor control apparatus of claim 15 wherein:
said basin cover is made of a material that is porous.

17. The odor control apparatus of claim 16 wherein:
said basin cover is made of a geotextile material.

18. An odor control apparatus for use in a pollution control lagoon of the type having a lagoon basin that is filled with an organic waste material having an aerobic layer and an anaerobic layer beneath the aerobic layer, comprising:
- a basin cover adapted to cover the surface of the waste material in the basin;
- an aerator positionable beneath the basin cover in the basin for receipt of air under pressure in order to introduce oxygen to the material beneath the cover to create and sustain an aerobic layer;
- said aerator including a U-shaped body with a tubular downflow leg and a tubular airlift leg;
- said legs having upper and lower ends with means connecting the lower ends of the legs for water flow between them;
- said upper ends being approximately at the same level when the U-shaped body is upright;
- a water inlet to the downflow leg;
- a water outlet from the airlift leg;
- said U-shaped body closed between the water inlet and water outlet;
- float means connected to the U-shaped body in a manner to buoyantly sustain the U-shaped body with respect to a fluid body, with the water inlet and water outlet submerged a short distance beneath the surface of the fluid body and the downflow leg and airlift leg downwardly extended, positioned to establish and maintain said aerobic layer in the fluid body when the aerator is positioned in a lagoon basin;
- a bubble generator connected to the interior of the airlift leg toward the lower end thereof;
- means for connecting the bubble generator to said source of air under pressure for disbursing bubbles into water located in the airlift leg whereby when air under pressure is supplied to the bubble generator, bubbles are introduced into the airlift leg to establish water circulation in the U-shaped body and oxygen is transferred from the bubbles to water discharged through the water outlet.

19. The odor control apparatus of claim 18 wherein:
the water inlet and water outlet of the aerator are horizontally disposed when the U-shaped body is in an upright position.

20. The odor control apparatus of claim 19 wherein:
the water inlet and water outlet of the aerator face in different directions.

21. The odor control apparatus of claim 20 wherein:
the water inlet and water outlet of the aerator are horizontally disposed and face in opposite directions.

22. A method of operating a facultative lagoon of the type containing polluted waste material in a basin, with an aerobic layer and an anerobic layer beneath the aerobic layer, comprising:
- covering the basin with a gas permeable cover disposed on the surface of the material in the basin;
- aerating the material in the basin in the aerobic layer using an aerator located in the aerobic layer a short distance beneath the cover, said aerator drawing water from the aerobic layer and discharging aerated water back into the aerobic layer.

* * * * *